(12) United States Patent  
Childress et al.

(10) Patent No.: US 8,522,271 B2
(45) Date of Patent: Aug. 27, 2013

(54) METHODS AND APPARATUSES FOR SHARING USER PROFILES

(75) Inventors: C. Cullen Childress, Austin, TX (US); Jason Kenagy, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 831 days.

(21) Appl. No.: 12/031,620

(22) Filed: Feb. 14, 2008

(65) Prior Publication Data
US 2009/0210898 A1 Aug. 20, 2009

(51) Int. Cl.
*H04N 7/10* (2006.01)
*H04N 7/025* (2006.01)

(52) U.S. Cl.
USPC .............................. 725/34; 725/46

(58) Field of Classification Search
USPC ....................................... 725/34, 46
See application file for complete search history.

(56) References Cited

U.S. PATENT DOCUMENTS

| 8,108,895 | B2* | 1/2012 | Anderson et al. | 725/36 |
| 2004/0073915 | A1 | 4/2004 | Dureau | |
| 2006/0080415 | A1 | 4/2006 | Tu | |
| 2008/0109843 | A1* | 5/2008 | Ullah | 725/34 |
| 2008/0216145 | A1* | 9/2008 | Barton et al. | 725/131 |
| 2009/0025025 | A1* | 1/2009 | Vleck et al. | 725/14 |
| 2009/0037949 | A1* | 2/2009 | Birch | 725/34 |

FOREIGN PATENT DOCUMENTS

| EP | 1455294 | 9/2004 |
| JP | 2006510965 A | 3/2006 |

OTHER PUBLICATIONS

International Preliminary Report on Patentability, PCT/US2009/032558, International Preliminary Examining Authority, European Patent Office, Mar. 11, 2010.
International Search Report, PCT/US2009/032558, International Searching Authority, European Patent Office, Apr. 21, 2009.
Written Opinion, PCT/US2009/032558, International Searching Authority, European Patent Office, Apr. 21, 2009.

* cited by examiner

*Primary Examiner* — Pankaj Kumar
*Assistant Examiner* — Charles N Hicks
(74) *Attorney, Agent, or Firm* — Fulbright & Jaworski LLP

(57) ABSTRACT

Embodiments include methods and apparatus for personalizing access to broadcast content items. One embodiment includes a method comprising detecting physical proximity of a mobile device, receiving data from the mobile device identifying a user of the mobile device, identifying at least one local profile based on the data identifying the user, identifying at least one content item accessed by the user on the mobile device, updating the local profile based on the identified content item, and delivering content items to the user by reference to the user profile. Other embodiments include systems and apparatus configured to perform the method and related functions.

42 Claims, 4 Drawing Sheets

METHODS AND APPARATUSES FOR SHARING USER PROFILES

RELATED APPLICATIONS

This application relates generally to communications, and more specifically, to communication of multimedia data.

BACKGROUND

Electronic devices such as mobile telephone handsets and other mobile devices may be configured to receive broadcasts of sports, entertainment, informational programs, or other multimedia content items. For example, audio and/or video data may be communicated using a broadband broadcast communications link to the electronic devices. There is a need to provide a person an enhanced viewing experience on such devices.

SUMMARY

The system, method, and devices of the invention each have several aspects, no single one of which is solely responsible for its desirable attributes. Without limiting the scope of this invention as expressed by the claims which follow, its more prominent features will now be discussed briefly. After considering this discussion, and particularly after reading the section entitled "Detailed Description of Certain Embodiments" one will understand how the features of this invention provide advantages that include an enhanced user interface providing customized multimedia access.

One embodiment includes a method of personalizing access to broadcast content items. The method comprises detecting at an access device physical proximity of a mobile device, receiving data at the access device from the mobile device identifying a user of the mobile device, identifying at the access device at least one local profile based on the data identifying the user, identifying at the access device at least one content item accessed by the user on the mobile device, and updating at the access device the local profile based on the identified content item. The method further includes delivering at least one other content item using the access device to the user by reference to the user profile. One embodiment includes a computer-program product, comprising a computer readable medium comprising codes executable by at least one processor of an access device to perform the method.

One embodiment includes a device for accessing broadcast content items. The device comprises a receiver configured to detect physical proximity of a mobile device, and receive data from the mobile device identifying a user of the mobile device. The device further comprises a storage configured to store at least one profile for accessing multimedia content items. The device further comprises a processor configured to identify the at least one profile stored by the storage based on the data identifying the user, identify at least one content item accessed by the user on the mobile device, and update the profile based on the identified content item.

One embodiment includes a device for accessing content items. The device comprises means for detecting physical proximity of a mobile device, means for receiving data from the mobile device identifying a user of the mobile device, means for storing at least one profile for accessing multimedia content items, and means for processing data. The processing means is configured to identify the at least one profile stored by the storing means based on the data identifying the user, identify at least one content item accessed by the user on the mobile device, update the profile based on the identified content item, and deliver content item to said user by reference to said user profile.

DETAILED DESCRIPTION

Figure 1:
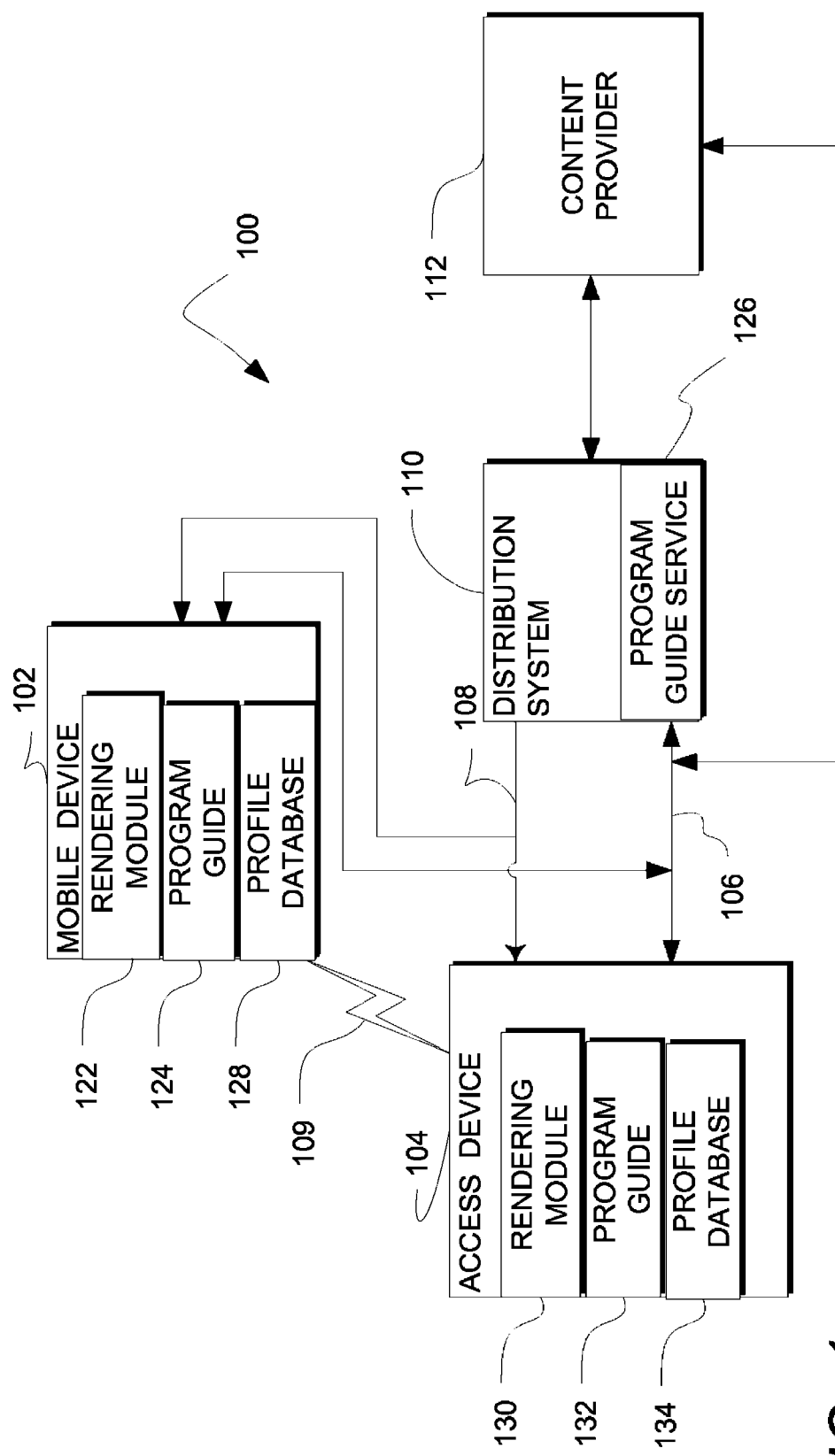
FIG. 1 is a block diagram illustrating an example system for providing broadcast programming.

The following detailed description is directed to certain specific embodiments of the invention. However, the invention can be embodied in a multitude of different ways as defined and covered by the claims. In this description, reference is made to the drawings wherein like parts are designated with like numerals throughout.

Devices for accessing multimedia data, such as set-top boxes for accessing audio/video broadcasts, video recorders, or other audio-video playback devices can be configured to provide services such as customized interfaces, and/or to identify personalized content or to otherwise customize content based on viewer preferences. When attached to a television or other video monitor, such devices may be accessed by any household member. Thus, in order to provide personalization services, the access device performs activities such as identifying a particular user within the household and maintaining data, either locally, or at a central repository, relating to that user by reference to, for example, content viewed by that user.

Mobile devices such as mobile handsets and music/video players are often used by a particular user. Additionally, such mobile devices may be configured to access multimedia content. Accordingly, a mobile device can log data relating to a particular user's content viewing experience. Such data can include content identifiers, genres, viewing time, interaction history, etc. In one embodiment, the access device is configured to use this viewing data from a mobile device, which is associated with a particular user profile, to update a user profile on the access device. The access device may select multimedia content items based on the profile, e.g., for playback by the access device. Such selected content may include broadcast content items or advertisements to be played along with broadcast or stored content items. For example, advertisements, movie trailers, or other content may be played back, alone or in conjunction with multimedia content tagged with insertion points for advertisements, by the access device based on the user viewing profile data received from the mobile device. Desirably, in addition to using content viewed on the mobile device to update a user profile for selecting content on the access device, the mobile device can be further used as a token to identify the user or users currently using the access device by detecting proximity of the mobile device.

In other embodiments, user profiles associated with viewing preference of the user or the household in general can be transferred to the mobile device. The mobile device may use the transferred viewing profile data to select content for display on the mobile device. For example, based on viewing patterns on the access device, the mobile device may identify and playback advertisements or other content. For example, advertisements or movie trailers may be played back, alone or in conjunction with multimedia content tagged with insertion points for advertisements, by the mobile device based on the user profile received from the access device.

FIG. 1 is a block diagram illustrating an example system 100 for providing broadcast programming to mobile devices 102 and to access devices 104 from one or more content providers 112 via a distribution system 110. While a single mobile device 102 and access device 104 is shown in FIG. 1, examples of the system 100 may be configured to use any number of mobile devices 102. The system 100 also includes a distribution system 110 and a content provider 112. The distribution system 110 may receive data representing a content item from the content provider 112. The content items may be communicated over a wired or wireless broadcast communication link 108. In one embodiment, the communications link 108 is a high speed or broadband link. In one embodiment, the content provider 112 may communicate the content directly to the mobile device 102 or the access device 104 (not shown in FIG. 1), bypassing the distribution system 110, via the same or a different communications link. It is to be recognized that in other embodiments multiple content providers 112 may provide content items via multiple distribution systems 110 to the mobile devices 102.

In the example system 100 of FIG. 1, the broadcast communication link 108 is illustrated as a unidirectional network. However, the broadcast communication link 108 may also be a fully symmetric bi-directional network that broadcasts data to a plurality of clients. For example, one embodiment, the broadcast communication link 108 comprises broadcast or multi-cast data packets over an internet protocol (IP) or similar network. Alternatively, the broadcast communication link 108 may be configured to communicate via a plurality of concurrent point to point IP links. The broadcast communication link 108 may comprise one or more wired and/or wireless links, including one or more of a Ethernet, telephone (e.g., POTS), cable, power-line, and fiber optic systems, and/or a wireless system comprising one or more of a code division multiple access (CDMA or CDMA2000) communication system, a frequency division multiple access (FDMA) system, a time division multiple access (TDMA) system such as GSM/GPRS (General Packet Radio Service)/EDGE (enhanced data GSM environment), a TETRA (Terrestrial Trunked Radio) mobile telephone system, a wideband code division multiple access (WCDMA) system, a high data rate (1xEV-DO or 1xEV-DO Gold Multicast) system, an IEEE 802.11 system, a MediaFLO system, a DMB system, an orthogonal frequency division multiple access (OFDM) system, or a DVB-H system. In one embodiment, in one or both of the access device 104 and the mobile device 102, the broadcast communication link 108 may include broadcast television networks, e.g., one or both of the access device 104 and/or the mobile device 102 may be configured to receive broadcasts from broadcast television systems such as ATSC digital television signals or the QAM digital cable television signals.

In the example system 100, one or both of the access device 104 and the mobile device 102 is also configured to communicate on a second communication link 106. The communication link 106 may include one or more wired or wireless networks such as described above with reference to the communication link 108. In one embodiment, the second communication link 106 is a two way communication link as is illustrated in the example system 100, however, the link 106 may also comprise a second link from the mobile device 102 to the distribution system 110 and/or the content provider 112. The second communication link 106 may also be a wireless network configured to communicate voice traffic and/or data traffic. The communication link 106 may communicate content items or other program guide and other data between the distribution system 110 and the mobile device 102.

Each of the mobile device 102 and the access device 104 may include rendering modules 122 and 130, respectively, configured to render the content items received over the broadcast communication link 108. The rendering modules 122 and 130 may include analog and/or digital technologies. The rendering modules 122 and 130 may include one or more multimedia signal processing systems, such as video encoders/decoders, using encoding/decoding methods based on international standards such as MPEG-x and H.26x standards. Such encoding/decoding methods generally are directed towards compressing the content items for transmission and/or storage.

In addition to communicating content items to the mobile device 102 and/or the access device, the distribution system 110 may also include a program guide service 126. The program guide service 126 receives program schedule and content related data from the content provider 112 and/or other sources and communicates data representing defining an electronic programming guide (EPG) 124 to the mobile device 102 or EPG 132 of the access device 104. The EPG 124 and/or 132 may include data related to the broadcast schedule of multiple content items available to be received over the broadcast communication link 108. The EPG data may include titles of content items, start and end times, category classification of content items (e.g., sports, movies, comedy, etc.), quality ratings, adult content ratings, etc. The EPG 124 and 132 may also be communicated to the mobile device 102 or access device 104 over the broadcast communication link 108 and stored in the mobile device 102.

In one embodiment, the mobile device 102 and the access device 104 are configured to communicate via the short range wireless link 109 such as a Bluetooth transceiver, a wireless Ethernet (e.g., 802.11a, b, g, or n), an ultra-wideband transceiver, an IRDA transceiver, or any other suitable link. In one embodiment, the access device 104 is configured to detect the physical proximity of the mobile device 102, for example, by detecting the mobile device 102 via the short range wireless link 102.

Each of the mobile device 102 and access device 104 may comprise a profile database 128 and 134, respectively, that is configured to store information indicative of content items selected for viewing by a user and profiles of the user. For example, the profile databases 128 and 134 may store data indicative of one or more content items that have been viewed, recorded, or otherwise accessed by the user. Moreover, the mobile device 102 and access device 104 may communicate data indicative of accessed content items to each other to synchronize user profiles on each device. The profiles may be updated based on data indicative of accessed content items, a category associated with the accessed content items, an elapsed viewing time of the accessed content items, and a channel associated with the content items. The profile database 134 in the access device 104 may include profiles for particular users, households, or default profiles for use when a particular user has not been identified for the device. The default profiles may be based on demographic or other data regarding particular users of such access device 104. In one embodiment, the default profile comprises a household profile that aggregates data about other users of the device 104 or device 102 and/or which aggregates data from unidentified users of the device 104 or device 102. In one embodiment, when the access device 104 detects the mobile device 102, e.g., for example when the mobile device 102 registers with or is accessing the communication link 109, the access device 104 identifies a profile for a particular user identified by the mobile device 102. Data from the profile database 128 of the mobile device 102 is communicated to the access device 104 which updates the identified profile in the profile database 134 of the access device 104.

As discussed above, in one embodiment, the access device 104 may be configured to detect the mobile device 102 based on the mobile device accessing the communications link 109. In another embodiment, the mobile device 102 identifies its location as being proximate to the location of the access device 104, e.g., via a GPS or other geolocation system, and initiates a data connection with the access device 104. In such an embodiment, the data connection may be via the short range communication link 109, via the communication link 106, or any other network such as the Internet. In one embodiment, the mobile device 102 may identify the location based on connection to a charging device for charging the battery 231.

A one-time or periodic registration process may be used to relate a user of a particular mobile device 102 with one or more user profiles of the access device 104. In one embodiment, such a process is initiated when an unregistered mobile device 102 is detected. The access device 104 may respond with an interface for establishing such associations.

Those of skill will recognize that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

Figure 2:
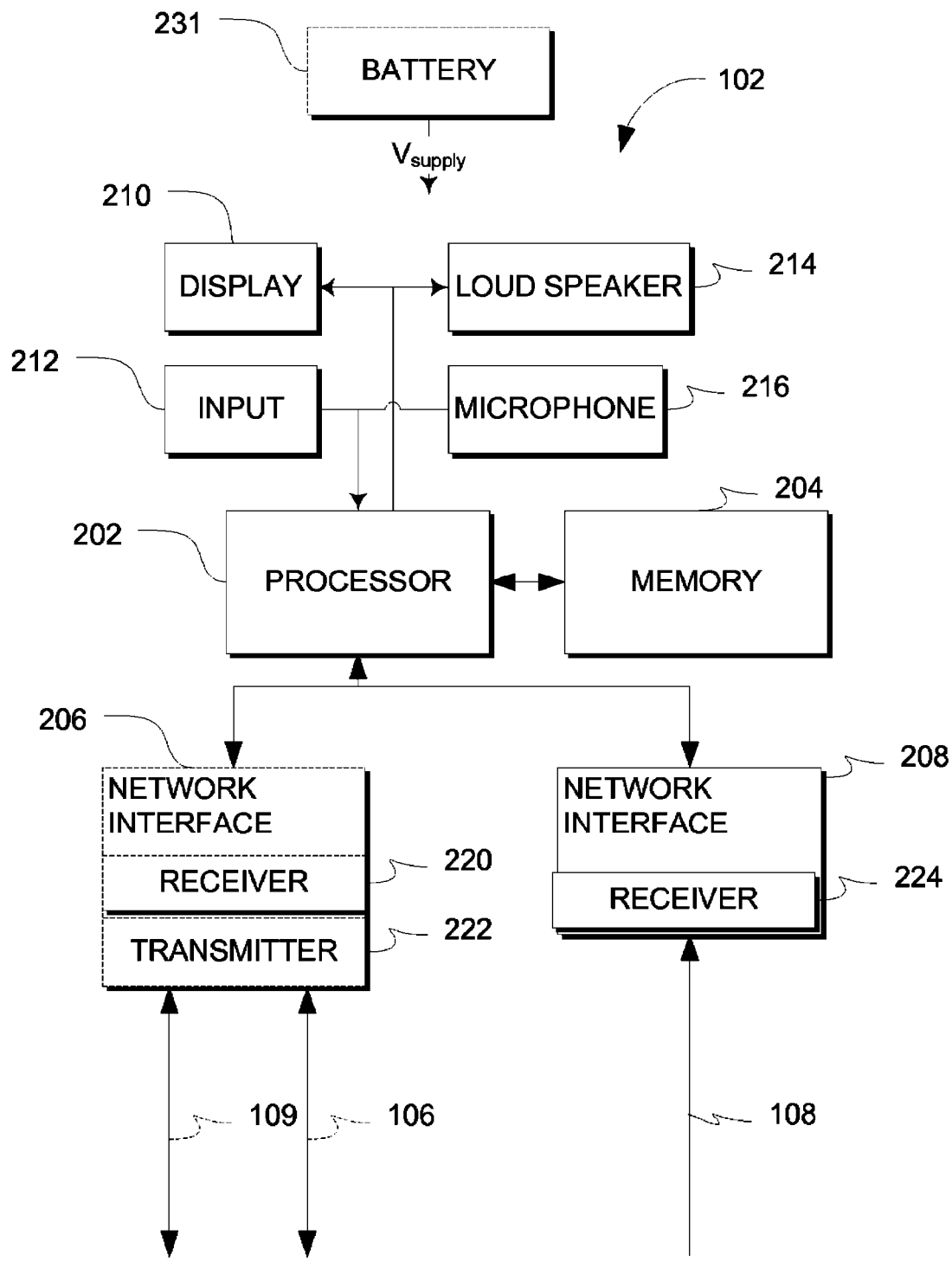
FIG. 2 is a block diagram illustrating an example of a mobile device such as illustrated in FIG. 1.

FIG. 2 is a block diagram illustrating an example of the mobile device 102 such the one illustrated in FIG. 1. The device 102 may comprise at least one of a mobile handset, a personal digital assistant, a laptop computer, a headset, a vehicle hands free device, or any other electronic device. For example, one or more aspects taught herein may be incorporated into a phone (e.g., a cellular phone), a personal data assistant ("PDA"), an entertainment device (e.g., a music or video device), a headset (e.g., headphones, an earpiece, etc.), a microphone, or any other suitable device. The device mobile 102 includes a processor 202 that is in communication with a memory 204 and a network interface 208 that communicates over the broadcast communication link 108. The network interface 208 includes a receiver 224 configured to receive data over the unidirectional broadcast communication link 108. The network interface 208 and receiver 224 may receive signals according to one or more wired or wireless systems such as described above with reference to the network 108.

The memory 204 may comprise one or both of volatile and non-volatile storage. For example, the memory 204 may comprise one or more of dynamic or static random access memory (RAM), flash memory, a disk drive, or any other suitable storage. In one embodiment, the memory 204 is configured to store user profile data comprising one or more of records of previously viewed content items and heuristics or other data indicative of patterns of content items identified as being of possible interest to a user of the mobile device.

The mobile device 102 may include an optional second network interface 206 for communicating via the second bi-directional communication link 106. The network interface 206 may include any suitable antenna (not shown), a receiver 220, and a transmitter 222 configured to communicate with one or more devices over the second communication link 106 using one or more of the network systems described above with reference to the communication links 106 and 108. Optionally, the network interface 206 may also have processing capabilities to reduce processing requirements of the processor 202.

The device 102 also includes one or more of a display 210, a user input device 212 such as a key, touch screen, or other suitable tactile input device, a loudspeaker 214 comprising a transducer adapted to provide audible output based on a signal received over the communication link 106 and/or a microphone 216 comprising a transducer adapted to provide audible input of a signal that may be transmitted over one or both of the communication links 106 and 108.

The device 102 may optionally include a battery 231 to provide power to one or more components of the device 102.

The components described herein may be implemented in a variety of ways. Referring to FIG. 2, the device or apparatus 102 is represented as a series of interrelated functional blocks that may represent functions implemented by, for example the processor 202, software, some combination thereof, or in some other manner as taught herein. The processor 202 and one or more of the other illustrated blocks may be implemented as one or more integrated circuits. Further, the transmitter 222 may comprise a processor for transmitting that provides various functionalities relating to transmitting information to another device. The receiver 220 may comprise a processor for receiving that provides various functionality relating to receiving information from another device.

The mobile device 102 may be configured to receive data concurrently from one or both of the communication links 106 and 108. In one embodiment, the network interface 206 may be configured to communicate over the short range wireless link 109 with the access device 104.

Figure 3:
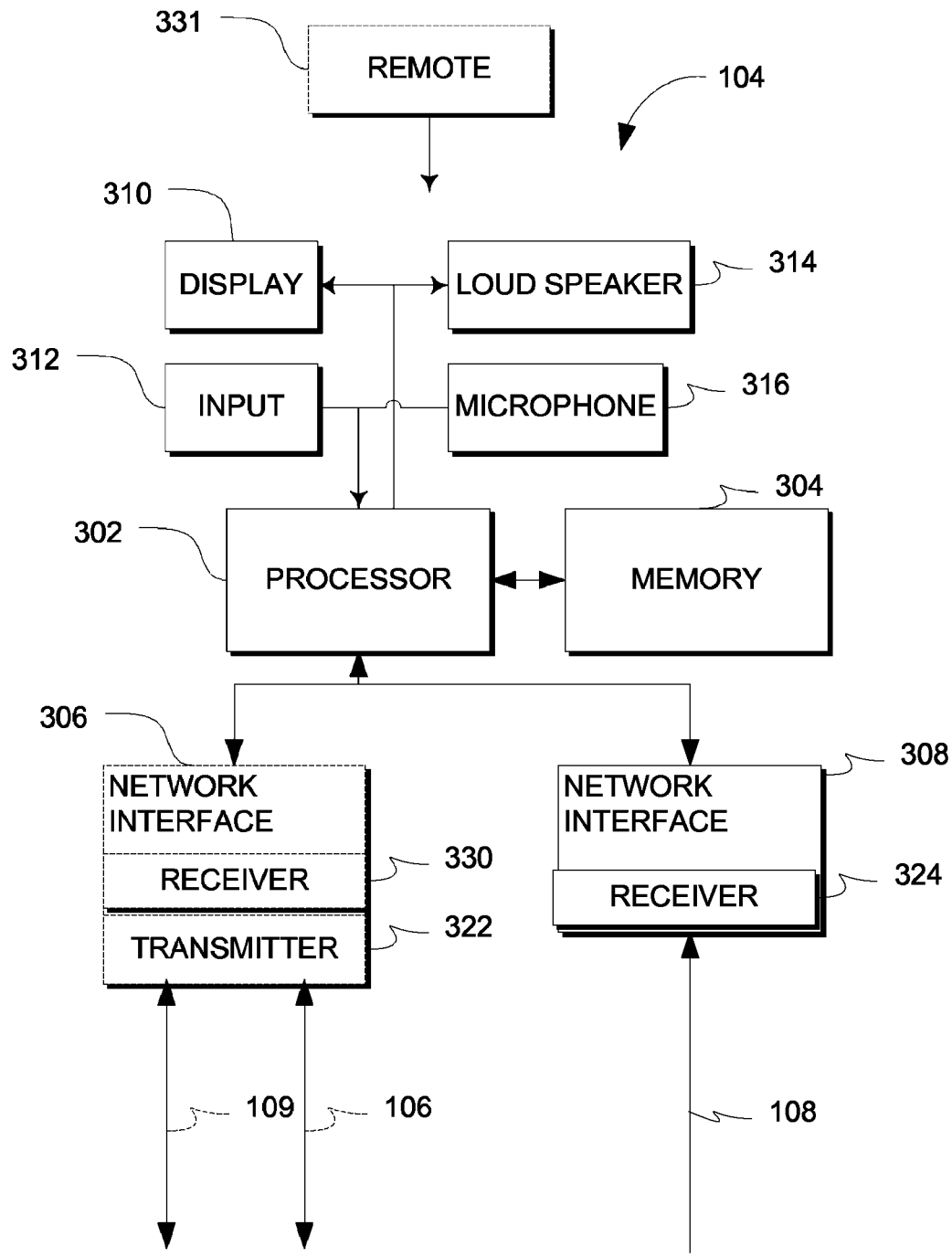
FIG. 3 is a block diagram illustrating an example of an access device such as illustrated in FIG. 1.

FIG. 3 is a block diagram illustrating an example of the access device 104 such as illustrated in FIG. 1. The access device 104 may comprise a set-top box for interfacing a display device with a cable, satellite, fiber, wireless, television or other broadcast network. The access device 104 may comprise a digital video recorder, a video playback device, and/or a networked video storage or streaming networked playback device. The access device 104 includes a processor 302 that is in communication with a memory 304 and a network interface 308 that communicates over the broadcast communication link 108. The network interface 308 includes a receiver 324 configured to receive the unidirectional broadcast communication link 108. The network interface 308 and receiver 324 may receive signals according to wired or wireless network protocols such as described above with respect to the receiver 224 of the mobile device 102. In addition, in one embodiment, the network interface 308 may comprise a receiver configured to receive broadcasts from broadcast television systems such as ATSC digital television signals or the QAM digital cable television signals. In one embodiment, the network interface 308 is bidirectional such as in the example of a two-way digital cable system.

The access device 104 may include an optional second network interface 306 for communicating via the second bi-directional communication link 106. The second network interface 306 may include any suitable antenna (not shown), a receiver 320, and a transmitter 322 so that the exemplary device 104 can communicate with one or more devices over the second communication link 106. Optionally, the second network interface 306 may also have signal processing capabilities to reduce processing requirements of the processor 302.

The memory 304 may comprise one or both of volatile and non-volatile storage. For example, the memory 304 may comprise one or more of dynamic or static random access memory (RAM), flash memory, a disk drive, or any other suitable storage. In one embodiment, the memory 204 is configured to store user profile data comprising one or more of records of previously viewed content items and heuristics or other data indicative of patterns of content items identified as being of possible interest to a user of the access device.

The device 104 may optionally include a remote 331. The access device 104 may be configured to receive commands from the remote 331 via an interface such as using a consumer IR protocol, a radio-frequency interface, or any other suitable interface.

The components described herein may be implemented in a variety of ways. Referring to FIG. 2, the device or apparatus 102 is represented as a series of interrelated functional blocks that may represent functions implemented by, for example the processor 302, software, some combination thereof, or in some other manner as taught herein. The processor 302 and one or more of the other illustrated blocks may be implemented as one or more integrated circuits. Further, the transmitter 322 may comprise a processor for transmitting that provides various functionalities relating to transmitting information to another device 104. The receiver 320 may comprise a processor for receiving that provides various functionality relating to receiving information from another device 104.

The device 104 may be configured to receive data concurrently from one or both of the communication links 106 and 108. In one embodiment, the network interface 306 may be further configured to communicate over the short range wireless link 109 to communicate with the remote device 102.

Figure 4:
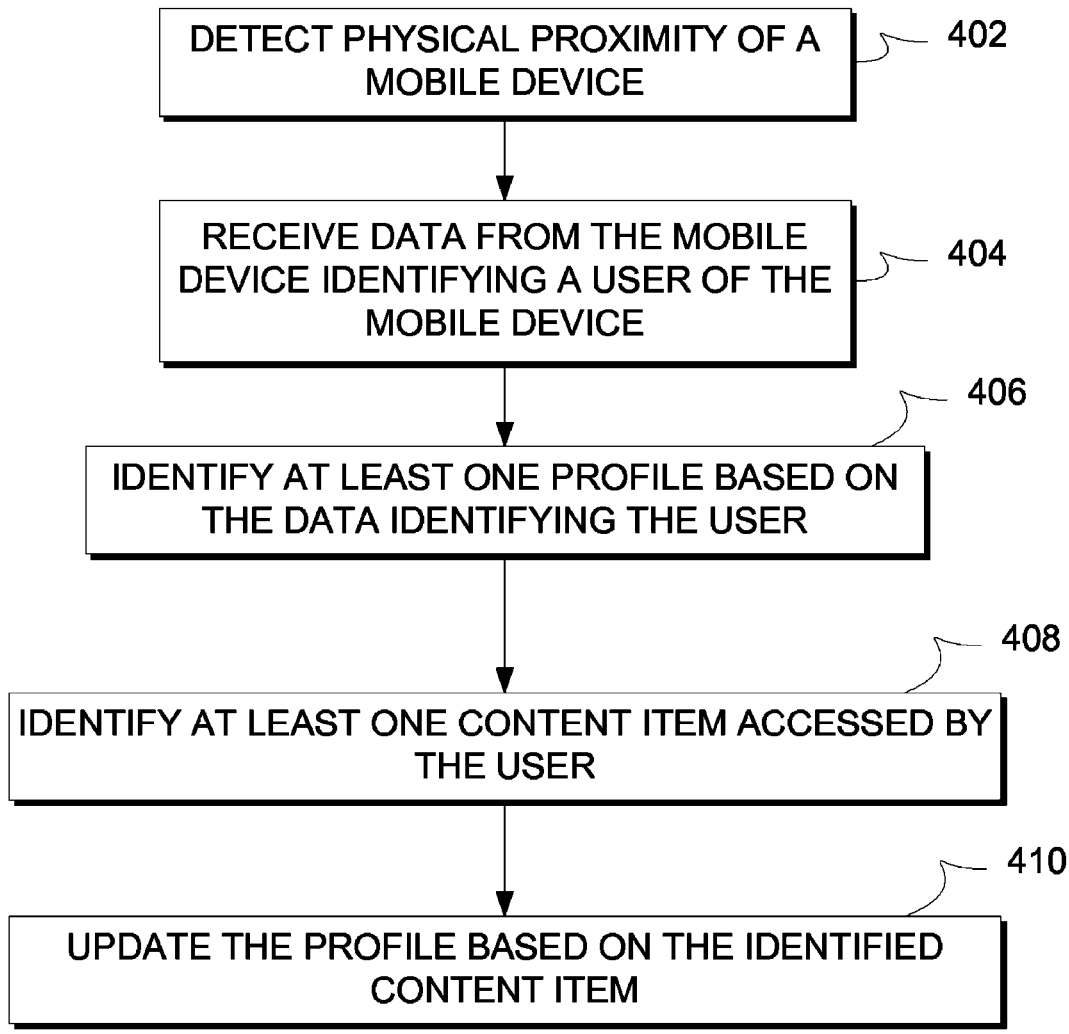
FIG. 4 is a flowchart illustrating an example of a method of using a mobile device to identify a profile for accessing broadcast content such as in the example system illustrated in FIG. 1.

FIG. 4 is a flowchart illustrating an example of a method 400 of using the mobile device 102 to identify a profile for accessing broadcast content on the access device 104. The method 400 begins at a block 402 in which the access device 104 detects physical proximity of the mobile device 102. In one embodiment, the access device 104 detects physical proximity of the mobile device 102 based on signals received via a short range communication link such as the communications link 109. In one embodiment, the access device 104 detects physical proximity of the mobile device 102 based on receiving data over a specified network such as the communication link 109. The access device 104 may detect the mobile device 102 based on the type of communication link 109, e.g., a wired interface such as USB that implies physical proximity due to use of a cable, or a wireless local network link such as Bluetooth or wireless Ethernet/802.11 that also implies physical proximity due to the typical range of such a wireless network (e.g., about 10 meter for Bluetooth and about 100 meter for wireless Ethernet). In one embodiment, the access device 104 may have a known, e.g., fixed, location or address and detect proximity of the mobile device 102 based on receiving a data signal from the mobile device 102 that provides the location of the mobile device, e.g., based on GPS, signal triangulation, or other suitable geolocation methods.

Next at a block 404, the access device 104 receives data from the mobile device 102 identifying a user of the mobile device 102. In one embodiment, the data may comprise, for example, one or more of a user's name, a unique identifier previously shared between the mobile device 102 and the access device 104 as part of a registration process, or an identifier of the mobile device 102 that is associated with a user of the access device 104 via the profile database 134 of the access device 104.

Moving to a block 406, the access device 104 identifies at least one local profile, e.g., in the profile database 134 of the access device 104, based on the data identifying the user. In one embodiment, the access device 104 may determine whether an existing local profile of the user available. If a local profile of the user is unavailable, the access device 104 may generate a default local profile for the user. For example, the access device 104 may generate the default local profile based on at least one other local profile. The other local profile may be for another user of the access device 104 or may include a household profile. The household profile may be an aggregate of other users of the access device 104, may be a profile based on content items that are accessed when no identified user is present, or may be a profile based on content items accessed when multiple identified users are present. In one embodiment, the access device 104 may identify the profile based on a process of elimination by identifying that particular mobile devices 102 are not proximate to the access device while the access device 104 is being used.

Next at a block 408, the access device 104 identifies at least one content item accessed by the user. In one embodiment, the identified content item is one that was previously identified by the mobile device 102 and which is identified based on data received from the mobile device 102. The identified content item may include, for example, a multimedia content item that has been played or viewed, a multimedia content item of which only a portion is accessed, or a multimedia content item that has been marked for storage and/or viewed via a personal video recorder function. In one embodiment, the accessing of the identified content item may be on the access device 104 or on the mobile device 102. When multiple identified users are in proximity to the access device (e.g., multiple mobile devices 102 have been detected), profiles of both users or a household or default profile may be updated. Alternatively, or in addition, when multiple identified users are proximate to the access device 104, selected criteria may be used to identify, for example, the user proximate first, the user proximate for the longest time, the user proximate most recently, and so forth.

Proceeding to a block 410, the access device 104 updates the local profile based on the identified content item. In one embodiment, the updated local profile is stored back to the profile database 134 of the access device 104. The access device 104 may update the local profile based on various heuristics or other rules or data. For example, the access device 104 may update the local profile based at least one of the identified content item, a category associated with the identified content item, an elapsed viewing time of the identified content item, and a channel associated with the identified content item. In one embodiment, the access device 104 communicates the updated local profile to the mobile device 102 for storage in the profile database 128 that is local to the mobile device 102.

The user profiles so updated may be used in a variety of ways. For example, the access device 102 (or the mobile device 102 based on the profiles in its profile database 128) may select at least one multimedia content item based at least partly on the profile to be stored, played, viewed, or otherwise accessed. For example, the profile may comprise a heuristic that stores a count or percentage of viewed content in different categories. Based on data indicative of one or more categories associated multimedia content items, the access device 102 may select content items that are associated with the highest count or percentage categories in the particular profile. In one embodiment, content items, including advertisements, may be tagged with data indicative of rules or heuristics to apply to select content based on profiles. For example, an advertisement in one category (e.g., for camping related products) may be tagged with a rule that selects recent or frequent viewers of particular content items.

The profile may also be updated based on other information stored on the mobile device 102. For example, information on web sites visited, mobile calling patterns, mobile navigation destinations and routes, or other mobile device activities may be used to update profiles on the access device 102 for the user of the mobile device. For example, advertisements may be selected for local advertisers based on recent or frequent navigation addresses and/or zip codes, or area codes/exchanges that are frequently dialed.

In one embodiment, the selected multimedia item may be indicated to the user via a user interface as a suggestion for access by the user. The profile may be updated based on whether or not the user accesses the suggested content. For example, if a user frequently views college basketball games or highlights (or games of a particular team) on their mobile device, the access device 104 may suggest other related content items (e.g., other games of that team) for accessing.

In one embodiment, user profiles may be used as at least a partial basis to select at least one advertisement to play proximate to a content item. For example, based on past viewing of particular categories of content items, the access device 104 or mobile device 102 may select advertisements for playing proximate to a content item. In one embodiment, where no suitable profile exists (e.g., because of lack of relevant information or lack of identification of the current user), the access device may identify a local profile of at least one other user and select at least one advertisement to play proximate to a multimedia content item based at least partly on that profile.

In one embodiment, the selected content item may be played during "trick-play," e.g., fast forward, reverse, or other scanning through another content item. For example, in a personal video recorder embodiment of the access device 104, selected advertisements may be played in at least a portion of the display while the user fast forwards through a content item (e.g., when the user fast forwards through stored advertisements). Targeted and/or more timely advertisements can be selected based on the identified profile and played in place of advertisements initially broadcast during, or for playback with, a particular content item.

It is to be recognized that depending on the embodiment, certain acts or events of any of the methods described herein can be performed in a different sequence, may be added, merged, or left out all together (e.g., not all described acts or events are necessary for the practice of the method). Moreover, in certain embodiments, acts or events may be performed concurrently, e.g., through multi-threaded processing, interrupt processing, or multiple processors, rather than sequentially.

In view of the above, one will appreciate that the invention provides ways of identifying user profiles to use for selecting or suggesting content for a user of an access device and/or to provide additional data for updating such profiles.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. As will be recognized, the present invention may be embodied within a form that does not provide all of the features and benefits set forth herein, as some features may be used or practiced separately from others. The scope of the invention is indicated by the appended claims rather than by the foregoing description. All changes which come within the meaning and range of equivalency of the claims are to be embraced within their scope.

The invention claimed is:

1. A method of personalizing access to content items, comprising:
    detecting physical proximity of a mobile device by an access device configured to access content items;
    receiving, at the access device, data from the mobile device identifying a user of the mobile device;
    identifying, at the access device, at least one local user profile based on the data identifying the user;
    identifying, at the access device, at least one content item accessed by the user on the mobile device, wherein the identified content item has been viewed by the user;
    updating, at the access device, the local profile based on the identified content item and an elapsed viewing time of the identified content item;
    communicating the updated local profile from the access device to the mobile device, wherein the updated local profile includes the elapsed viewing time of the identified content item; and
    delivering at least one other content item using the access device to said user by reference to said user profile, wherein delivering the at least one other content item comprises selecting the at least one other content item based at least on a percentage of viewed content in different categories.

2. The method of claim 1, wherein detecting physical proximity of the mobile device comprises detecting physical proximity of the access device to the mobile device based on a signal received by the access device from the mobile device.

3. The method of claim 1, wherein detecting physical proximity of the mobile device comprises detecting physical proximity of the mobile device based on receiving data from the mobile device over a specified network interface.

4. The method of claim 1, further comprising identifying, at the access device, at least one multimedia content item based at least partly on the profile.

5. The method of claim 4, further comprising updating a second local profile of at least one other user based on the identified content item.

6. The method of claim 1, wherein updating the local profile comprises updating the local profile based on at least one of the at least one content item, a category associated with the content item, and a channel associated with the content item.

7. The method of claim 1, further comprising selecting, at the access device, at least one advertisement to render to the user associated with the local profile based at least partly on the local profile.

8. The method of claim 1, further comprising:
identifying a second local profile of at least one other user; and
selecting at least one advertisement to render based at least partly on the second profile.

9. The method of claim 1, wherein the data received from the mobile device comprises data indicative of at least one of content item previously viewed by the user on the mobile device.

10. The method of claim 1, wherein identifying the local profile comprises:
determining that a local profile of the mobile device user is unavailable; and
generating a default local profile for the user.

11. The method of claim 10, wherein generating a default local profile comprises generating the default local profile based on at least one other local profile.

12. An access device for accessing content items, comprising:
a receiver configured to:
detect physical proximity of a mobile device;
receive data from the mobile device identifying a user of the mobile device;
a storage configured to store at least one profile for accessing multimedia content items; and
a processor configured to:
identify, at the access device, the at least one profile stored by the storage based on the data identifying the user;
identify, at the access device, at least one content item accessed by the user on the mobile device, wherein the identified content item has been viewed by the user;
update, at the access device, the profile based on the identified content item and an elapsed viewing time of the identified content item;
communicate the updated local profile from the access device to the mobile device, wherein the updated local profile includes the elapsed viewing time of the identified content item; and
deliver at least one other content item to said user by reference to said user profile, wherein the processor is configured to delivery the at least one other content item by selecting the at least one other content item based at least on a percentage of viewed content in different categories.

13. The device of claim 12, wherein the receiver is configured to detect physical proximity of the access device to the mobile device based on a signal received from the mobile device.

14. The device of claim 12, wherein the receiver is configured to detect physical proximity of the mobile device based on receiving data from the mobile device over a specified network interface.

15. The device of claim 12, wherein updating the profile comprises updating the profile based on at least one of the at least one content item, a category associated with the content item, and a channel associated with the content item.

16. The device of claim 12, wherein the processor is further configured to identify at least one content item based at least partly on the profile.

17. The device of claim 12, wherein the processor is further configured to identify advertisements to render based at least partly on the local profile.

18. The device of claim 12, wherein the processor is further configured to identify a second profile stored by the storage; and
identify at least one advertisement to render based at least partly on the second profile.

19. The device of claim 12, wherein the processor is further configured to:
determine that an existing local profile of the user is unavailable; and
generate a default profile for the user.

20. The device of claim 12, wherein the processor is further configured to generate the default profile based on at least one other profile stored by the storage.

21. The device of claim 12, wherein the data received from the mobile device comprises data indicative of at least one of content item viewed by the user on the mobile device.

22. An access device for accessing content items, comprising:
means for detecting physical proximity of a mobile device;
means for receiving data from the mobile device identifying a user of the mobile device;
means for storing at least one profile for accessing multimedia content items; and
means for processing data, said means configured to:
identify, at the access device, the at least one profile stored by the storing means based on the data identifying the user;
identify, at the access device, at least one content item accessed by the user on the mobile device, wherein the identified content item has been viewed by the user;
update, at the access device, the profile based on the identified content item and an elapsed viewing time of the identified content item;
communicate the updated local profile from the access device to the mobile device, wherein the updated local profile includes the elapsed viewing time of the identified content item; and
deliver a content item to said user by reference to said user profile, wherein the means for processing data is configured to deliver the content item by selecting the content item based at least on a percentage of viewed content in different categories.

23. The device of claim 22, wherein the detecting means is configured to detect physical proximity of the access device to the mobile device based on a signal received from the mobile device.

24. The device of claim 22, wherein the detecting means is configured to detect physical proximity of the mobile device based on receiving data from the mobile device over a specified network interface.

25. The device of claim 22, wherein updating the profile comprises updating the profile based on at least one of the at least one content item, a category associated with the content item, and a channel associated with the content item.

26. The device of claim 22, wherein the processing means is further configured to identify at least one content item based at least partly on the profile.

27. The device of claim 22, wherein the processing means is further configured to identify advertisements to render based at least partly on the local profile.

28. The device of claim 22, wherein the processing means is further configured to identify a second profile stored by the storage; and
identify at least one advertisement to render based at least partly on the second profile.

29. The device of claim 22, wherein the processing means is further configured to:
determine that an existing local profile of the user is unavailable; and
generate a default profile for the user.

30. The device of claim 29, wherein the processing means is further configured to generate the default profile based on at least one other profile stored by the storage.

31. The device of claim 22, wherein the data received from the mobile device comprises data indicative of at least one of content item viewed by the user on the mobile device.

32. A computer-program product, comprising:
a non-transitory computer readable medium comprising codes executable by at least one processor of an access device to:
detect physical proximity of a mobile device;
receive data from the mobile device identifying a user of the mobile device;
identify, at the access device, at least one local profile based on the data identifying the user;
identify, at the access device, at least one content item accessed by the user on the mobile device, wherein the identified content item has been viewed by the user;
update, at the access device, the local profile based on the identified content item and an elapsed viewing time of the identified content item;
communicate the updated local profile from the access device to the mobile device, wherein the updated local profile includes the elapsed viewing time of the identified content item; and
deliver a content item to said user by reference to said user profile, wherein the at least one processor of the access device delivers the content item by selecting the content item based at least on a percentage of viewed content in different categories.

33. The product of claim 32, further comprising codes executable by the at least one processor to detect physical proximity of the access device to the mobile device based on a signal received by the access device from the mobile device.

34. The product of claim 32, further comprising codes executable by the at least one processor to physical proximity of the mobile device based on receiving data from the mobile device over a specified network interface.

35. The product of claim 32, further comprising codes executable by the at least one processor to identify at least one multimedia content item based at least partly on the profile.

36. The product of claim 35, further comprising codes executable by the at least one processor to update a second local profile of at least one other user based on the identified content item.

37. The product of claim 32, further comprising codes executable by the at least one processor to update the local profile based on at least one of the at least one content item, a category associated with the content item, and a channel associated with the content item.

38. The product of claim 32, further comprising codes executable by the at least one processor to select at least one advertisement to render to the user associated with the local profile based at least partly on the local profile.

39. The product of claim 32, further comprising codes executable by the at least one processor to:
identify a second local profile of at least one other user; and
select at least one advertisement to render based at least partly on the second profile.

40. The product of claim 32, wherein the data received from the mobile device comprises data indicative of at least one of content item previously viewed by the user on the mobile device.

41. The product of claim 32, further comprising codes executable by the at least one processor to:
determine that a local profile of the mobile device user is unavailable; and
generate a default local profile for the user.

42. The product of claim 41, further comprising codes executable by the at least one processor to generate the default local profile based on at least one other local profile.

* * * * *